United States Patent Office 3,227,543
Patented Jan. 4, 1966

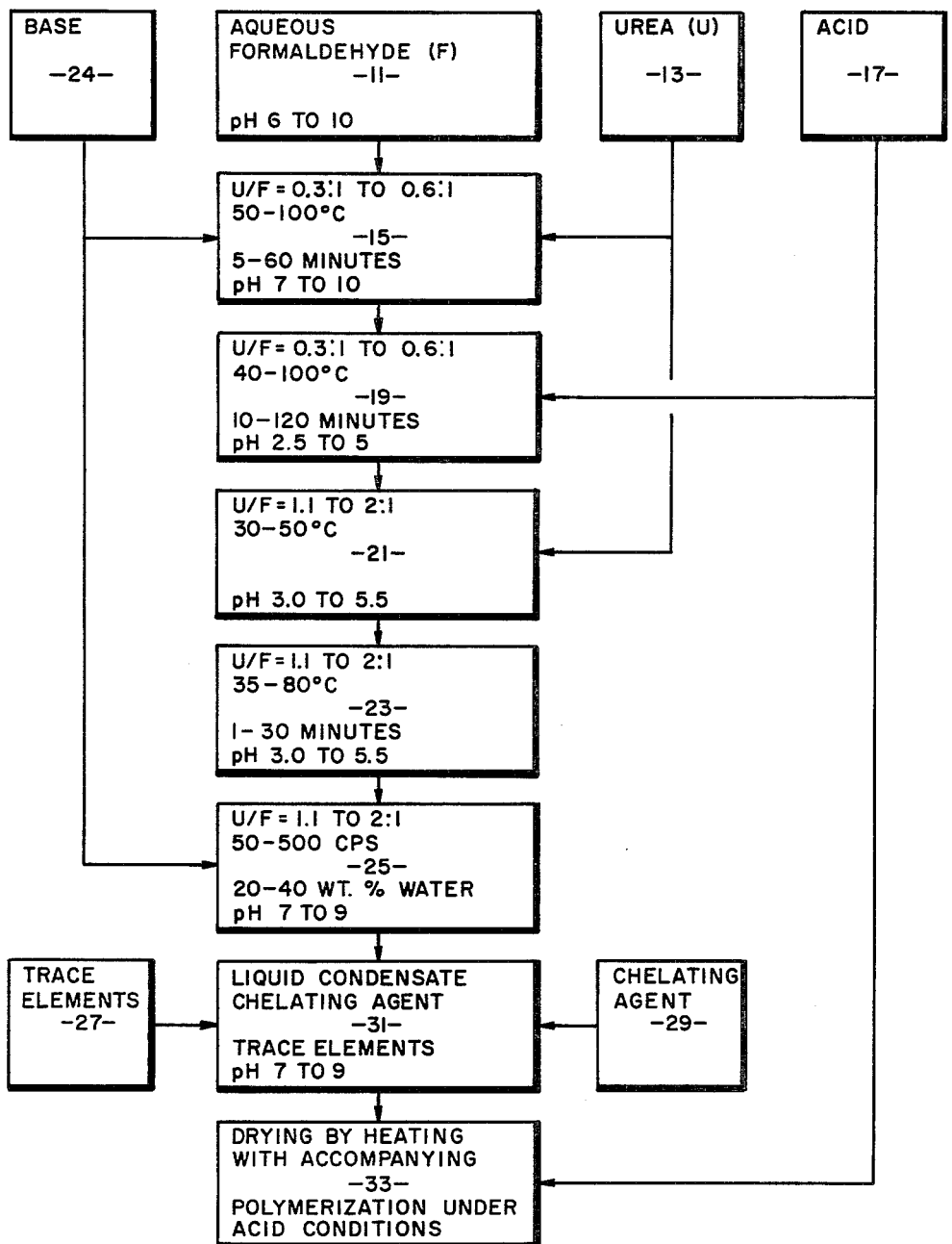

3,227,543
MANUFACTURE AND USE OF UREA-FORMALDE-
HYDE COMPOSITIONS IN FERTILIZER
James M. O'Donnell, North Smithfield, R.I., assignor to
Hercules Powder Company, Wilmington, Del., a corporation of Delaware
Original application Apr. 27, 1961, Ser. No. 106,003, now Patent No. 3,198,761, dated Aug. 3, 1965. Divided and this application Mar. 8, 1965, Ser. No. 453,234
10 Claims. (Cl. 71—28)

This application is a division of my co-pending application No. 106,003, now Patent No. 3,198,761 and a continuation-in-part of my application No. 609,486 filed September 12, 1956, now abandoned.

This invention relates to a method for the production of stable, liquid urea-formaldehyde condensates containing urea in a mole ratio to formaldehyde greater than 1:1 and characterized by unique film-forming properties, and to stable, liquid urea-formaldehyde compositions so produced. In another aspect this invention relates to solid urea-formaldehyde fertilizer compositions containing chelating agents and/or trace elements, uniformly distributed, and suspended, therein, in slowly releasable form. In still another aspect, this invention relates to the production of the above fertilizer compositions by the formulation of a stable liquid urea-formaldehyde condensate, above referred to, and then incorporating in the said liquid one or both of the said chelating agents and trace elements followed by polymerizing the resulting liquid admixture, under acid conditions, and drying, to produce the solid fertilizer product.

Urea-formaldehyde compositions in the resin and fertilizer arts contain urea and formaldehyde in relative mole ratios over a broad range, for example, from 0.1:1 to 2:1 and higher. Many processes have been proposed for the manufacture of these compositions, each process leading to a composition characterized by a suitable combination of urea and formaldehyde to meet the purpose at hand. In the resin art liquid urea-formaldehyde compositions contain formaldehyde in a mole ratio to urea greater than 1, the formaldehyde and urea being to a large extent chemically combined in such form as to be readily convertible to products such as adhesives and molding powders. These solutions provide for storage and shipping of formaldehyde and urea in form of highly concentrated liquids.

The fertilizer art has advantageously utilized solid urea-formaldehyde compositions containing formaldehyde in a mole ratio to urea less than 1 inasmuch as these compositions provide a water-insoluble but slowly available source of nitrogen for "slow release" during the entire growing season. These compositions have been identified as "urea-form," that term defining the composition as the product of an acid catalyzed polymerization or condensation of the urea and formaldehyde and containing urea in a mole ratio to formaldehyde greater than one and also containing at least 35 percent nitrogen, a major portion of which is in water-insoluble, but slowly available, form.

Liquid urea-form solutions, or suspensions, have met with very little use heretofore particularly in view of their instability over prolonged and in many instances even relatively short periods. However, as in the resin art, production of such stable solutions would constitute a marked improvement in the art inasmuch as such liquids could be applied by any suitable spraying technique and shipped and stored in liquid form for subsequent incorporation with other fertilizer ingredients as needed.

The function of trace elements in the soil as plant food (i.e. minor elements suitable for plant nourishment other than nitrogen, phosphorus, potassium, calcium, magnesium and sulfur, which are major fertilizer elements), is well recognized in the art. Typical trace elements are iron, manganese, copper, zinc, boron, cobalt and molybdenum, all of which have been described in the art as most agronomically useful. In soil conditions where there is a lack of one or more of trace elements, it is, of course, imperative that they be supplied to the soil in requisite amount. It has been proposed that trace elements be incorporated with fertilizer ingredients for that purpose. However, most often, the problem of water solubility is presented, the extent of which is, of course, dependent upon the particular trace elements and the form in which they are added.

Whether the trace element occurs naturally in the soil or is added to supplement plant feeding, it has been the practice to also include a chelating agent in combination therewith. Although the role of the chelating agent is not clear at the present time, it, in combination with the trace elements, assists the latter in its function to facilitate plant growth by the formation of a chelate, i.e., reaction of the chelating agent with the trace element to form a chelate structure. It is very likely that the effect of the chelation is, among other functions, to increase water solubility of the trace element so that the latter can be assimilated more readily by the plant.

Chelating agents often utilized heretofore, and preferred in the practice of the invention as described hereinafter, are free amino polycarboxylic acids and their salts with alkali, alkaline earth, and heavy metals, e.g., copper, lead, iron, nickel, cobalt, palladium, rhodium and ruthenium. Exemplary of such amino polycarboxylic compounds are ethylene diamine tetraacetic acid (EDTA), diethylene diamine triacetic acid, N,N'-dihydroxylethyl ethylene diamine diacetic acid, diethylene triamine pentaacetic acid (DTPA), N-hydroxyethyl ethylene diamine triacetic acid, and alkali metal, alkaline earth and heavy metal salts thereof. Exemplary of typical chelates derived from alkaline earth and heavy metal salts of amino polycarboxylic acids are ferric disodium ethylene diamine tetraacetic acid ($FeNa_2$ EDTA), monosodium ferrous N-hydroxyl ethylene diamine triacetic acid (NaFe HE EDTA), magnesium disodium ethylene diamine tetraacetic acid (MgNa EDTA), disodium ethylene diamine tetraacetic acid, and the like.

The term "EDTA compounds" is used herein to refer to those chelating agents, preferred in the practice of the invention, i.e., ethylene diamine tetraacetic acid and salts thereof. The term "EDTA type compound" is used herein to typify the preferred acids and salts of ethylene diamine tetraacetic acid.

Exemplary U.S. patents illustrative of the art's understanding of the role of chelating agents in combination with trace elements in the soil and techniques for adding them to the soil, particularly as fertilizer composition ingredients are: Bersworth, U.S. 2,407,645; Riddle, U.S. 2,280,451; Vana, U.S. 2,732,290 and O'Donnell, U.S. 2,882,141.

The Vana patent describes the simple admixture of synthetic fused trace element mixtures using urea-form type fertilizers, and the O'Donnell patent discloses generally the addition of amino polycarboxylic acid compounds to urea-forms. However, a three-component fertilizer system containing urea-form and amino polycarboxylic acid compound (chelating agent) and trace elements, as a physical mixture, is disadvantageous in that segregation of the particles occurs within the mixture due to the extremely fine particle size of the trace element compound and of the chelating agent so that these latter compounds become more readily available for plant consumption than the other fertilizer ingredients. Such overall combination product (physical mixture) also contains the chelating agent and other water-soluble compounds in readily water-leachable form.

Thus, a key problem in the art has been that of developing a urea-form, and process for its manufacture, suitable for incorporation therewith of chelating agents and trace element ingredients in the requisite proportions and which will be uniformly dispersed throughout the composition and slowly released to the soil along with the major fertilizer ingredients.

This invention is concerned with the production of liquid urea-formaldehyde condensates which contain urea in a mole ratio to formaldehyde in excess of one and which are stable over prolonged periods and can be further reacted with urea or formaldehyde to produce finished fertilizers or resins as the case may be; and with the manufacture of slow-release type urea-form fertilizers containing chelating agents alone or with trace elements which are uniformly dispersed in the fertilizer and slowly releasable with the nitrogen. The invention is further concerned with compositions so produced.

It is an object of the invention to provide highly stable liquid urea-formaldehyde condensates containing urea in a mole ratio to formaldehyde greater than 1 and which can be stored over prolonged periods and then further reacted with urea or formaldehyde to form the desired urea-formaldehyde end product. It is another object to provide a urea-form fertilizer composition containing urea in a mole ratio to formaldehyde greater than 1 and a chelating agent alone or together with one or more trace elements uniformly distributed therein for slow release to the soil with the nitrogen. Another object is to provide a process for the production of the above described stable liquid urea-formaldehyde condensates. Another object is to provide a process for the manufacture of urea-form fertilizer compositions containing chelating agents alone or together with trace elements, of the kind above described. Other objects and aspects will be apparent in light of the accompanying disclosure and the appended claims.

In accordance with the invention a stable liquid urea-formaldehyde condensate, containing urea in a mole ratio to formaldehyde greater than 1, is produced by dissolving urea in aqueous formaldehyde in a mole ratio of urea to formaldehyde within the range of from 0.3:1 to 0.6:1; maintaining the resulting urea-formaldehyde solution at a temperature of from 50 to 100° C. and at a pH of from 7.0 to 10.0 for a period of from 5 to 60 minutes; thereafter regulating the said pH to a value within the range of from 2.5 to 5.0 and maintaining the resulting reaction mixture at a temperature of 40 to 100° C. for a period of from 10 minutes to 2 hours, whereby a liquid methylol urea-containing reaction product is formed; adding urea to the resulting methylol urea-containing reaction mixture in an amount sufficient to provide a mole ratio of total added urea to formaldehyde therein in the range of from 1:1 to 2:1 and then heating the resulting admixture at its existing pH, generally from a pH of 3.0 to 5.5, for a period of from 1 to 30 minutes at a temperature in the range of from 35 to 80° C. to form said condensate; and recovering said condensate as product of the process. Neutralization of the said condensate product to an alkaline pH of 7 to 9 is usually necessary for maximum stability.

Further in accordance with the invention, liquid condensate product above described is incorporated with a substantial amount of an amino polycarboxylic acid compound as a chelating agent, and also, when desired, with one or more trace elements suitable for plant nourishment, followed by polymerizing and drying the resulting liquid mixture under acid conditions to provide residual solids as fertilizer product of the invention, the said fertilizer product being of the urea-form type and containing a chelating agent and trace elements, when the latter is desired, both uniformly dispersed in the fertilizer and slowly yieldable to the soil along with the nitrogen, as free chelating agent, free trace element or chelate (chelated trace element). Still further in accordance with the invention, condensate product above described is further heated at an acid pH under suitable time-temperature conditions for effecting polymerization and drying of the liquid to provide a solid urea-form fertilizer product. The longer the time of heating, the lower is the temperature required in carrying out the drying-polymerization step. For example, suitable polymerization and drying can be obtained at 50 to 150° C. within a period of from 10 minutes to 16 hours whereas the same degree of polymerization and drying can be obtained at a lower temperature over a longer period, say at from 20 to 50° C. for a period of from 1 to 10 days.

It is to be recognized that the conventional preparation of urea-form compounds involves a simple combination of urea and formaldehyde in a mole ratio of added urea to formaldehyde within the range of 1.2:1 to about 1.5:1 or higher followed by acidification to form a resulting solid polymer which is then neutralized for final stability and use. These materials, i.e., after acid polymerization, are generally obtained as finely divided solids from a dilute solution or as a solid mass from a concentrated solution.

The present invention, on the other hand, proceeds through a preliminary polymethylol urea stage in the formation of a stable liquid intermediate, partially condensed product, containing from about 20 to 40 weight percent water, and having exceptional film-forming properties on drying. The stable liquid product has the ability to incorporate added materials such as chelating agents alone, or together with trace elements, to form chelates, into the film structure as it is formed. Upon polymerization under acid conditions and drying, a solid film-like product with the properties of a urea-form fertilizer is obtained. Furthermore, in contrast to the addition of chelating agent alone or with trace elements, to a solid urea-form, or to a urea-formaldehyde before condensation, the added materials in the practice of the invention are so incorporated into the structure of the solid product obtained as to be sufficiently insolubilized but to be releasable to the soil at desirably slow rate.

The liquid condensate of the invention is, therefore, particularly adapted for in situ addition of trace elements and chelating agents so that upon polymerization and drying with concomitant formation of polymer film product, the trace element and chelating agent ingredients, dispersed uniformly throughout the mixture, are rigidly supported in their initially dispersed position throughout the polymer and released to the soil in their free form or as chelated trace elements, with the nitrogen, at a desirably slow rate.

In the preferred practice of the invention, urea is dissolved in the aqueous formaldehyde in a mole ratio to formaldehyde within the range of from 0.35:1 to 0.45:1; the resulting urea-formaldehyde solution is maintained at a temperature of from 60 to 80° C. at a pH of from 8.5 to 9.5 for from 20 to 30 minutes; the said pH is then regulated to a value of from 3 to 4 and the resulting reaction mixture is heated at 70 to 90° C. for 15 to 30 minutes; urea is then added in an amount to provide an overall mole ratio of added urea to added formaldehyde of from 1.2:1 to 1.5:1 with accompanying temperature drop to about 40 to 45° C. and resulting pH of from about 3.3 to 4.5; and the resulting reaction mixture is heated at 40 to 60° C. for 5 to 15 minutes to provide the liquid product condensate. When neutralizing the said product for stability purposes the pH is adjusted to a value of from 8.0 to 8.5. The said product condensate generally contains from 25 to 30 percent water. As illustrated with reference to Example IV, neutralization of the liquid product, for stabilization purposes, can be dispensed with when it is to be directly utilized, i.e., without first being passed to storage.

The invention is further illustrated with reference to the block diagram of the attached drawing. Thus, formaldehyde 11 adjusted to a pH of from 6 to 10, generally by the addition of sodium hydroxide or potassium hydroxide, is admixed with urea 13 in relative proportions to provide a resulting admixture 15 containing urea in a mole ratio to formaldehyde of from 0.3:1 to 0.6:1, often about 0.35:1 to 0.45:1, the pH of admixture 15 being adjusted by base 24, for example, aqueous sodium hydroxide, to a value in the order of about 7 to 10, more often about 8.5 to 9.5. Admixture 15 is heated at about 50 to 100° C. for 5 to 60 minutes, and then admixed with a suitable acid 17, for example, phosphoric acid, to provide acidified reaction mixture 19 at a pH of from about 2.5 to 5.0. Reaction mixture 19 is then heated at about 40 to 100° C., for a period up to about two hours, more often from about 10 to 60 minutes and more preferably for about 15 to 30 minutes.

Additional urea 13 is then added to the acid mixture 19 to form mixture 21, the amount of urea added being such as to adjust the overall mole ratio of added urea to formaldehyde to a value in the range of from about 1:1 to 2:1, more often 1.2:1 to 1.5:1, the temperature of mixture 21 decreasing during this time to say, a value in the order of about 30 to 50° C. due to the negative heat of solution of the urea, and the pH increasing somewhat to a value of from about 3.0 to about 5.5. Mixture 21 is then, as mixture 23, further heated at a temperature in the range of about 35 to 80° C. for a period of from about 1 to 30 minutes, the above preferred temperature and time conditions therefor being more often utilized. Mixture 23 is then neutralized with an additional portion of base 24 to provide a free flowing liquid 25 at a pH of from about 7 to 9, more often 8.0 to 8.5, the said liquid being characterized by a viscosity generally ranging from about 50 to 500 cps. (Brookfield viscometer) and a water content of from about 20 to about 40 percent, more often about 25 to 30 percent, the said water content being based on total dried weight of solids in mixture 25.

Product 25 can be dried to form a thin film of polymer having a nitrogen content in the order of about 37 percent, a water insoluble nitrogen content in the order of about 22 percent and an A.I. value (described hereinafter) of about 80. Preferably, however, in the event that product 25 is to be converted directly to a urea-form type composition, it is first acidified to a pH in the range of from about 2.5 to 5.5 and dried by heating at a temperature in the order of from about 70 to 90° C. for about .5 to 5.0 hours under which conditions polymerization of the condensate takes place to form a solid urea-form type product having a water insoluble nitrogen content in the order of about 60 to 70 percent and an A.I. value in the order of about 40 to 55.

However, in the manufacture of a three-component fertilizer composition, in the practice of one form of the invention, condensate product 25 is admixed with from about 2 to 50 weight per cent of trace element material 27 and with from about 2 to 20 weight percent of a chelating agent, generally an amino carboxylic acid compound 29 to form a liquid three-component fertilizer mixture 31, both percentages being based on the total solids content of mixture 25. The resulting liquid three-component mixture is then dried as mixture 33 by heating at say, 70 to 90° C. at a pH of from about 2.5 to 5.5 for about one hour, generally from about 0.5 to 5 hours, under which conditions polymerization proceeds to form a resulting urea-form type fertilizer containing trace elements and chelating agent uniformly dispersed therein and only slowly available to the soil with the nitrogen, the resulting three-component composition being characterized by an insoluble nitrogen content in the order of about 60 to 70 percent and an A.I. factor in the order of about 40 to 55.

However, only, a chelating agent need be added during the preparation of the fertilizer composition 31, i.e., to yield a three-component fertilizer composition 31' (not shown) in those instances wherein the soil contains a sufficient amount of trace elements. In that event, addition of trace element material 27 can be dispensed with without requiring that the subsequent heating procedure, to effect drying and polymerization, as described with reference to mixture 33, be in any way altered.

It is also advantageous to control availability of water soluble trace elements, e.g., iron sulfate, to the soil by incorporating them into the solid urea-formaldehyde for slow release as done with respect to chelating agents and trace element mixtures. This can also be done without altering the above described drying and polymerization steps.

The invention is further illustrated with reference to the following examples.

EXAMPLE I

To 300 pounds of a 37 percent solution[1] of formaldehyde was added 60 pounds of urea, resulting in a mole ratio of urea-formaldehyde of 0.5:1. The pH was adjusted to 7.5 with caustic soda and the temperature was brought up to 90° C. The pH of this mixture was then reduced to 3.0 and 5 percent sucrose derived from a corn extraction was added to the mix at this point.

The entire mix was held at reflux for about one hour at which time it was neutralized with triethanolamine and the temperature reduced to 60° C. At this point enough urea was added to adjust the final formula to a U/F mole ratio of 1.36:1 and negative heat of the solution lowered the temperature to 30° C. The entire mixture was acidified to a pH of 3.0 with hydrochloric acid. An exothermic reaction occurred which raised the temperature to 60° C. The viscosity of the slurry increased to about 400 cps. at which time gaseous ammonia was introduced to the system in order to neutralize and check the reaction. At this point 18 pounds of disodium ethylene-diaminetetraacetate was added to the slurry mix as well as 80 pounds of trace element mix IM defined elsewhere herein. The mixture was agitated vigorously to insure an even distribution of all particles and the material was then placed in trays and dried under vacuum to remove all excessive moisture. A brittle, glassy urea-formaldehyde film was the result of the preparation which was ground to a minus 20 mesh size. The total nitrogen content was 37 percent; A.I. value 52.

EXAMPLE II

The process of Example I was followed substituting 80 pounds of Ferro FTE for the trace element mix IM.

FERRO FTE—EXTRACTION RESULTS ON TRACE ELEMENT FRITS [1]

| pH | Fe | Mn | Cu | Zn | B |
|----|-----|-------|-----|-----|-----|
| 4  | 460 | 1,410 | 320 | 730 | 445 |
| 5  | 70  | 670   | 125 | 335 | 117 |
| 6  | 15  | 260   | 38  | 96  | 62  |
| 7  | −5  | 102   | 10  | 17  | 23  |

[1] Obtained from Ferro Corporation, Cleveland, Ohio.

[1] Aqueous.

TRACE ELEMENT MIX IM—ANALYSIS OF
TRACE ELEMENT MIX IM[1]

| | |
|---|---|
| Copper | 2.62 |
| Manganese | 7.86 |
| Zinc | 5.24 |
| Iron | 11.53 |
| Titanium | 1.57 |
| Boron | 2.62 |
| Barium | 2.62 |
| Strontium | 1.31 |
| Lead | 1.31 |
| Molybdenum | .26 |
| Cobalt | .06 |
| Nickel | .06 |
| Vanadium | .06 |

[1] Obtained from the International Minerals Corp.

EXAMPLE III

Richmond Hill plantation is situated in the Ogeechee River basin about 14 miles south of Savannah, Georgia. This plantation for years has been known as one of the best lettuce producing farms in the southeast. The entire plantation consists of about 2000 acres devoted to diversified truck farming and principally the raising of iceberg lettuce.

The heaviest producing area of this farm is a section known as Cherry Hill Marsh, consisting of about 300 acres of heavy almost muck soil created by dredging and dyking the Ogeechee River. For ten or fifteen years Cherry Hill Marsh produced lettuce of outstanding quality and grade.

For the past four or five years, however, yield and quality showed steady decline in spite of sound agricultural practices.

Experiments involving the use of urea-form, EDTA compounds, and trace element mixtures were conducted, and the 300 acres has been subjected to various types of treatment involving 150 separate experiments.

For the purpose of demonstrating the effects of controlled EDTA compound application, urea-form and trace element availability, 12 experiments are shown and compared: In the following, the results for plot 6 correspond to the composition of Example I and the results of plot 12 correspond to the composition of Example II.

Urea-form—urea-formaldehyde polymer produced in accordance with Example I.
Urea-form Fe 5 percent—urea-form to which has been added 5 percent ferric disodium ethylene diamine tetraacetic acid.
Urea-form Na$_2$, 5 percent—urea-form to which has been added 5 percent disodium ethylene diamine tetraacetic acid.

(1) 100 lbs./acre urea-form 1:36 mole ratio activity index 52.

(2) 120 lbs./acre urea-form Fe 15 percent 1:36 U/F mole ratio, activity index 50.

(3) 120 lbs./acre urea-form Fe 5 percent 1:36 U/F mole ratio, activity index 55.

(4) 110 lbs./acre urea-form Na$_2$ 1:36 U/F mole ratio, activity index 52.

(5) 110 lbs./acre urea-form Na$_2$ 15 percent 1:36 mole ratio; 25 lbs./acre trace element mix IM.

(6) 110 lbs./acre urea-form Na$_2$ 5 percent 1:36 U/F mole ratio; 25 lbs./acre trace element mix IM (see Example I).

(7) 80 lbs./acre urea; 15 lbs./acre Na$_2$ EDTA; 25 lbs./acre fritted trace elements—Ferro FTE.

(8) 80 lbs./acre urea; 15 lbs./acre Na$_2$EDTA; 25 lbs./acre trace element mix IM.

(9) 80 lbs./acre urea; 25 lbs./acre fritted trace elements—Ferro FTE.

(10) 80 lbs./acre urea; 25 lbs./acre trace element mix IM.

(11) Check plot.

(12) 110 lbs./acre urea-form Na$_2$ 5 percent 1:36 (see Example II); 25 lbs./acre Ferro FTE (see Example II).

*Yield data*

| Experiment No. | Crates Acre | | | | Grading | | | Total[1] tons acre |
|---|---|---|---|---|---|---|---|---|
| | 1st pick | 2d pick | 3rd pick | Total | 3 | 4 | 6 | |
| 1 | 220 | 100 | 92 | 412 | 20% | 30% | 50% | 14.42 |
| 2 | 400 | 120 | | 620 | 60% | 30% | 10% | 21.70 |
| 3 | 320 | 150 | 30 | 500 | 50% | 40% | 10% | 17.50 |
| 4 | 400 | 80 | | 480 | 40% | 40% | 20% | 16.80 |
| 5 | 705 | 51 | | 756 | 60% | 35% | 5% | 26.46 |
| 6 | 720 | 60 | | 780 | 55% | 40% | 5% | 27.30 |
| 7[2] | 200 | 120 | 100 | [2]420 | 20% | 40% | 40% | 14.70 |
| 8 | 400 | 150 | | 550 | 50% | 30% | 20% | 19.25 |
| 9 | 300 | 105 | 105 | 510 | 40% | 50% | 10% | 17.85 |
| 10 | 320 | 130 | 50 | 500 | 45% | 50% | 5% | 17.50 |
| 11 | 120 | 100 | 80 | 300 | 10% | 20% | 70% | 10.50 |
| 12 | 650 | 70 | 36 | 720 | 10% | 35% | 5% | 27.00 |

[1] Includes rejects and outside leaves.
[2] Rather severe toxic signs during early growth.

The experiments on lettuce production showed in some cases almost a 100 percent increase in yield and far more than 100 percent increase in better grading. Experiments 5, 6 and 12 illustrate the preferred three-component compositions of the present invention.

Experiment 6 used compositions from procedure of Example I and Experiment 12 used compositions from the procedure of Example II. Experiments 5, 6 and 12 showed unique superiority over analogous one and two-component systems shown in Experiments 1 to 4 inclusive. Experiments 5, 6 and 12 additionally showed unique superiority over analogous two and three-component systems of unresinified urea shown in Experiments 7 to 11.

The amount of amino polycarboxylic acid compound and the amount of trace element mixture most advantageously present in the solid urea-formaldehyde (urea-form) polymer from the plant food standpoint is, of course, contingent largely on rate of release required in a determined amount of time, rate of growth stimulant or trace element application desired per given area, frequency and extent of solubilizing factors such as rainfall, soil condition, and the extent to which nitrogen in a slowly available form was desired. However, contents of from 2 to 50 percent trace element mixture and from about 2 to 20 percent amino polycarboxylic acid compound are generally adequate and are readily incorporated into the urea-form in accordance with the invention.

EXAMPLE IV

Thirty-seven percent aqueous formaldehyde (200 g.) was adjusted to a pH of 7.0 using dilute sodium hydroxide solution. Urea (65 g.) was then added to the formaldehyde to give a urea-formaldehyde mole ratio of 0.42:1, and the mixture was heated at 45° C. over a 5-minute period to form a clear solution. The pH of the solution was then adjusted from 7.3 to 9.4 using 50% NaOH and the resulting solution was heated for 25 minutes at 90° C. The still-clear solution was cooled to 80° C. and the pH was adjusted from 7.6 to 3.5 using 42% H$_3$PO$_4$. It was then heated for 20 minutes at 80° C., during which time it remained clear. Additional urea (126 g.) was then added to give a final urea-formaldehyde mole ratio of 1.3:1. Addition of the urea caused the temperature to drop to 45° C. The mixture was stirred for 3 minutes at 45° C. The resulting reaction mixture, a solution, was now cloudy and had a pH of 4.3, and constituted a liquid condensate product of the invention, referred to hereinafter as product A.

A portion (100 g.) of the above liquid condensate product A was removed from the said reaction mixture and was poured directly into a dish to form a 3/16 in. layer and allowed to stand at 20-25° C. After 24 hours the film was quite hard and brittle. After 56 hours the film was ground in a mortar and the particles were screened to recover material passing a 10-mesh screen and retained on 30 mesh.

In the preparation of a chelating agent to be utilized as described hereinafter a disodium salt of ethylene diamine tetraacetate (11.2 grams) was dissolved in 50 ml. of hot water. To this was added a hot solution of an equimolar amount (11.8 g.) of ferrous ammonium sulfate in 50 ml. of water. The resulting thick paste was filtered and washed with 10 ml. of water. After air drying, the yellow-brown solid iron-salt complex so produced was ground to a fine powder.

A second portion (100 g.) of the same liquid condensate was removed from the reaction mixture and directly mixed thoroughly with 3.5 g. of the iron complex described above, and a film was cast, air dried, ground, and screened in a manner identical with that described above. On a dry basis this material contained 5 percent of the iron complex and is designated herein as product B.

Two glass tubes (10 mm. I.D.), each closed with glass wool at the bottom, were filled with the screened dried products to form two columns about 12 in. high. One column was packed with 20 g. of the material containing 5 percent of the iron complex, i.e., product B. The other column was packed with a thoroughly blended, mechanical mixture of 19 g. of screened product A plus 1.0 g. of the iron complex prepared as above described to provide a mechanical mixture containing 5 percent of the iron complex. Room temperature (20-25° C.) water was then allowed to drain through each of these columns and then collected. The following table summarizes the observations made.

*Table*

| Leaching Sample | Screened Sample B ||| Screened Sample A plus 5 percent complex |||
|---|---|---|---|---|---|---|
| | Leaching water (ml.) | Iron in leaching water (g.) | Color of leaching water | Leaching water (ml.) | Iron in leaching water (g.) | Color of leaching water |
| 1 | 25 | 0.0052 | Very yellow | 25 | 0.0460 | Yellow-brown. |
| 2 | 25 | 0.0050 | do | 25 | 0.0029 | Very light yellow. |
| 3 | 25 | 0.0054 | Yellow | 25 | 0.0004 | Colorless. |
| 4 | 25 | 0.0056 | do | 25 | 0.0001 | Do. |
| 5 | 25 | 0.0056 | Light yellow | 25 | 0.0002 | Do. |
| 6 | 25 | 0.0054 | do | 25 | 0.0001 | Do. |
| 7 | 50 | 0.0029 | Yellow | | | |
| 8 | 50 | 0.0014 | Very light Yellow | | | |
| 9 | 50 | 0.0012 | Almost colorless | | | |

Example IV further demonstrates that the rate of leaching is many times lower in the case of the screened sample B than in the case of the screened sample A mechanically mixed with the iron complex. This is further exemplary of the unique film-forming properties of the liquid U/F condensate products of the invention and the manner by which the chelating agent and trace elements are held in the polymerized and dried condensate in uniformly dispersed suspension for slow release with the nitrogen to the soil.

The pH of a third portion of the liquid product A was adjusted to 8.5 utilizing 20 percent aqueous sodium hydroxide. The resulting product was free flowing and contained no appreciable amount of sediment material after 40 days' storage at ambient room temperature.

EXAMPLE V

Thirty-seven percent aqueous formaldehyde (200 g.) was adjusted to pH 7.0 using 20 percent NaOH solution. Urea (65 g.) was added to the formaldehyde to give a urea-formaldehyde mole ratio of 0.44:1 and the mixture was heated at 45° C. for 5 minutes to dissolve the urea. The pH of the solution was then adjusted from 7.2 to 9.4 using 50 percent NaOH and the solution was heated for 25 minutes at 80° C. The still clear solution was adjusted to pH 3.5 using 42 percent $H_3PO_4$. The solution was then heated for 35 minutes at 80° C. during which time it remained clear. Additional urea (126 g.) was then added to give a final U/F mole ratio of 1.3. Addition of the urea caused the temperature to drop to 45° C. The mixture was stirred at 45° C. for 10 minutes, the pH now being 4.0. The pH of the resulting liquid product condensate was then adjusted to 8.5 with 20 percent NaOH solution. The said product was an opaque solution and was free flowing and contained no appreciable amount of sediment material after 36 days' storage at ambient room temperature.

A portion of this solution (100 g.) (U/F condensate of the invention) was adjusted to pH 3.5 using 42 percent $H_3PO_4$ and then poured out into a thin layer and allowed to react at 80° C. for 2 hours. The resultant urea-form product had an A.I. of 55, with 23 percent WIN (cold water insoluble nitrogen).

EXAMPLE VI

Five hundred grams of 5-10-10 (N, $P_2O_5$, $K_2O$, weight percent remainder inerts) finely ground mixed fertilizer was mixed in a laboratory granulator with 300 g. 16 mesh vermiculite. To this was added 100 ml. water. Three hundred g. of the product condensate prepared as in Example V was then added. When satisfactory granulation was achieved (10 to 15 min.) the product was dried in a rotary drum drier for 1.0 hour at 80 to 100° C. Aided by the acidity inherent in the 5-10-10 fertilizer (the aqueous slurry had a pH of 4.7), the result was a granulated mixed fertilizer containing urea-form having an A.I. of 55.

EXAMPLE VII

Forty-three grams of product condensate prepared as in Example V was adjusted to pH 4.5 using 20 percent $H_3PO_4$ and thoroughly mixed with 20 g. No. 4 vermiculite. The product was dried for 16 hours at 50° C. The urea-form made had an A.I. of 56 and 58 percent of the total nitrogen was cold water insoluble.

EXAMPLE VIII

One hundred grams of the condensate product prepared as in Example V and 65 g. 46 percent aqueous formaldehyde were mixed, and the pH of the solution was adjusted to pH 8.5. The solution was refluxed for 15 minutes and cooled to 85° C. The pH was adjusted to 3.5 and the solution was refluxed until the viscosity at 25° C. increased from 24 cps. to 1100 cps. This viscosity change is typical of resin formation from urea and formaldehyde. The resin product contained formaldehyde in a mole ratio to urea of 1.8:1.

The stability of the liquid product condensate at a pH of about 7 or higher of the invention is such that it is free flowing and free from any appreciable amounts of sediment after periods of at least 20 days and up to about 55 days.

EXAMPLE IX

The following tabulation illustrates stability characteristices of several liquid product condensates, each prepared in accordance with the process illustrated with reference to Examples IV and V hereinabove.

| Alkaline treatment (25 min.) | | | Acid treatment | | | | | | | Product stability at 25° C.[1] (days) |
| --- | --- | --- | --- | --- | --- | --- | --- | --- | --- | --- |
| | | | Before urea add | | | After urea add | | | | |
| pH | Temp. (° C.) | U/F (mole) | pH | Temp. (° C.) | Time (min.) | pH | Temp. (° C.) | Time (min.) | U/F (mole) | |
| 10.0 | 90 | 0.44 | 3.5 | 80 | 20 | 3.5 | 70 | 10 | 1.30 | 35 |
| 8.0 | 70 | 0.44 | 3.5 | 80 | 20 | 3.5 | 45 | 10 | 1.42 | 30 |
| 8.0 | 70 | 0.50 | 3.5 | 80 | 20 | 3.5 | 45 | 20 | 1.42 | 30 |
| 9.4 | 70 | 0.44 | 3.5 | 80 | 20 | 3.5 | 45 | 2 | 1.30 | 25 |
| 9.4 | 70 | 0.44 | 3.5 | 90 | 10 | 3.5 | 45 | 2 | 1.29 | 25 |
| 9.0 | 90 | 0.5 | 3.5 | 80 | 20 | 3.5 | 45 | 10 | 1.40 | 55 |
| 9.4 | 60 | 0.5 | 3.5 | 80 | 20 | 3.5 | 50 | 10 | 1.40 | 28 |

[1] The number of days observed to be free flowing and free of any appreciable amount of sediment. pH of each sample tested was adjusted to the alkaline side at the time the sample was taken from the process for storage.

Although when referring herein to trace element mixtures, it is meant a mixture which, as illustrated, contains one or more trace elements suitable for nourishment of the soil, it is also intended to include single trace element materials such as, for example, iron sulfate or other suitable compounds which supply but a single trace element.

Although the invention contemplates generally, trace elements of limited water solubility, those characterized by higher solubility, e.g., iron sulfate above mentioned, are also within the scope of the invention. It is in any event, the concept of controlling the rate of release of the trace element (or chelating agent or both) to the soil that is basic to the fertilizer compositions of the invention; and that it is in turn determined by dispersion and suspension of the material in the solid slowly water soluble urea-form "film."

By the expression A.I. value referred to herein is meant "activity index" which test measures the percent of cold water insoluble nitrogen that dissolves in a hot buffered phosphate solution. The A.I. test has further acceptance in the fertilizer industry and is referred to in the following publications:

"Report of the Subcommittee Recommendations of the Referee-Nitrogen Activity Index," Smith, J. F.

J.A.O.A.C. 38 No. 1, page 64 (1955) and Official Publication A.A.F.C.O. No. 8 (1954), page 14 (N-0-16 urea formaldehyde fertilizer materials).

The A.I. test is conventionally known as the Kralovec-Morgan Test for Nitrogen Activity (Ag. and Food Chem. 2, No. 2, page 92 to 94 (1954)). The A.I. is calculated in accordance with the formula:

$$A.I. = \frac{(\%CWIN - \%HWIN) \times 100}{\%CWIN}$$

A.I.=activity index
CWIN=cold water (25° to 2° C.) insoluble nitrogen
HWIN=hot water (99° C. to 100° C.) insoluble nitrogen in phosphate buffer solution As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. A process for the production of a urea-form fertilizer which comprises admixing urea with aqueous formaldehyde in a mole ratio of urea to formaldehyde within the range of from 0.3:1 to 0.6:1 under temperature conditions for dissolving the urea in the said aqueous formaldehyde; maintaining the resulting urea-formaldehyde solution, as a reaction mixture, at a temperature of from 50 to 100° C. and at a pH of from 7 to 10 for a period of from 5 to 60 minutes; thereafter reducing the pH of the said reaction mixture to a value within the range of from 2.5 to 5.0 and maintaining same at a temperature within the range of from 40 to 100° C. for a period of from 5 to 60 minutes; adding additional urea to the resulting reaction mixture in an amount sufficient to provide a mole ratio of total added urea to total added formaldehyde therein within the range of from 1:1 to 2:1 and then heating same for a period of from 1 to 35 minutes at a temperature within the range of from 35 to 70° C., whereby a liquid urea-formaldehyde condensate is formed; admixing with condensate so produced, from 2 to 20 weight percent of an amino polycarboxylic acid compound as an agent for forming a chelate structure in the soil with trace elements therein, the amount of said amino polycarboxylic compound being based on the solids content of said condensate admixed therewith; and heating the resulting liquid amino polycarboxylic compound-containing condensate under conditions for drying same to form a solid, whereby polymerization of components of said condensate also takes place and said solid contains said amino polycarboxylic acid compound uniformly dispersed therein for slow release to the soil, and recovering said solid, as the said fertilizer product of the process.

2. A process of claim 1 wherein from 2 to 50 percent of a trace element mixture, based on the said solid content of said condensate, containing at least one element suitable for nourishment of the soil is added to said liquid condensate, whereby said trace element mixture is also uniformly distributed throughout said solid product for slow release to the soil.

3. A process for the production of a urea-form fertilizer which comprises admixing urea with aqueous formaldehyde in a mole ratio of urea to formaldehyde within the range of from 0.35:1 to 0.45:1 under temperature conditions for dissolving the urea in the said aqueous formaldehyde; maintaining the resulting urea-formaldehyde solution, as a reaction mixture, at a temperature of from 60 to 80° C. and at a pH of from 8.5 to 9.5 for a period of from 20 to 30 minutes; thereafter reducing the pH of the said reaction mixture to a value within the range of from 3 to 4 and maintaining same at a temperature within the range of from 70 to 90° C. for a period of from 15 to 30 minutes; adding additional urea to the resulting reaction mixture in an amount sufficient to provide a mole ratio of total added urea to total added formaldehyde therein within the range of from 1.2:1 to 1.5:1 and then heating same over a period of from 5 to 15 minutes at a temperature of from 40 to 60° C., whereby a liquid urea-formaldehyde condensate is formed; admixing with condensate so produced, from 2 to 20 weight percent of an amino polycarboxylic acid compound as an agent for forming a chelate structure in the soil with trace elements therein, the amount of said amino polycarboxylic compound being based on the solids content of said condensate admixed therewith; and heating the resulting liquid amino polycarboxylic compound-containing condenate under conditions for drying same to form a solid, whereby polymerization of components of said condensate also takes place and said solid contains said amino polycarboxylic acid compound uniformly dispersed therein for slow release to the soil, and recovering said solid, as the said fertilizer product of the process.

4. A process of claim 3 wherein from 2 to 50 percent of a trace element mixture, based on the said solid content of said condensate, containing at least one element suitable for nourishment of the soil is added to said liquid condensate, whereby said trace element mixture is also uniformly distributed throughout said solid product for slow release to the soil.

5. A process of claim 1 wherein said amino polycarboxylic acid compound is disodium ethylene diamine tetraacetate.

6. A process of claim 3 wherein said amino polycarboxylic acid compound is disodium ethylene diamine tetraacetate.

7. An improved solid urea-form type fertilizer composition containing a chelating agent uniformly dispersed therein for slow release to the soil, prepared by admixing urea with aqueous formaldehyde in a mole ratio of urea to formaldehyde within the range of from 0.3:1 to 0.6:1 under temperature conditions for dissolving the urea in the said aqueous formaldehyde; maintaining the resulting urea-formaldehyde solution, as a reaction mixture, at a temperature of from 50 to 100° C. and at a pH of from 7 to 10 for a period of from 5 to 60 minutes; thereafter reducing the pH of the said reaction mixture to a value within the range of from 2.5 to 5.0 and maintaining same at a temperature within the range of from 40 to 100° C. for a period of from 5 to 60 minutes; adding additional urea to the resulting reaction mixture in an amount sufficient to provide a mole ratio of total added urea to total added formaldehyde therein within the range of from 1:1 to 2:1 and then heating same for a period of from 1 to 35 minutes at a temperature within the range of from 35 to 70° C., whereby a liquid urea-formaldehyde condensate is formed; admixing with condensate so produced, from 2 to 20 weight percent of an amino polycarboxylic acid compound as an agent for forming a chelate structure in the soil with trace elements therein, the amount of said amino polycarboxylic compound being based on the solids content of said condensate admixed therewith; and heating the resulting liquid amino polycarboxylic compound-containing condensate under conditions for drying same to form a solid, whereby polymerization of components of said condensate also takes place and said solid contains said amino polycarboxylic acid compound uniformly dispersed therein for slow release to the soil, and the said solid constituting said urea-form fertilizer composition.

8. A solid urea-form type fertilizer composition of claim 7 wherein from 2 to 50 percent of a trace element mixture, based on the said solid content of said condensate, containing at least one element suitable for nourishment of the soil is added to said liquid condensate, whereby said trace element mixture in also uniformly distributed throughout said solid product for slow release to the soil.

9. An improved solid urea-form type fertilizer composition containing a chelating agent uniformly dispersed therein for slow release to the soil prepared by admixing urea with aqueous formaldehyde in a mole ratio of urea to formaldehyde within the range of from 0.35:1 to 0.45:1 under temperature conditions for dissolving the urea in the said aqueous formaldehyde; maintaining the resulting urea-formaldehyde solution, as a reaction mixture, at a temperature of from 60 to 80° C. and at a pH of from 8.5 to 9.5 for a period of from 20 to 30 minutes; thereafter reducing the pH of the said reaction mixture to a value within the range of from 3 to 4 and maintaining same at a temperature within the range of from 70 to 90° C. for a period of from 15 to 30 minutes; adding additional urea to the resulting reaction mixture in an amount sufficient to provide a mole ratio of total added urea to total added formaldehyde therein within the range of from 1.2:1 to 1.5:1 and then heating same over a period of from 5 to 15 minutes at a temperature of from 40 to 60° C., whereby a liquid urea-formaldehyde condensate is formed; admixing with condensate so produced, from 2 to 20 weight percent of an amino polycarboxylic acid compound as an agent for forming a chelate structure in the soil with trace elements therein, the amount of said amino polycarboxylic compound being based on the solids content of said condensate admixed therewith; and heating the resulting liquid amino polycarboxylic compound-containing condensate under conditions for drying same to form a solid, whereby polymerization of components of said condensate also takes place and said solid contains said amino polycarboxylic acid compound uniformly dispersed therein for slow release to the soil, and the said solid constituting said urea-form fertilizer composition.

10. An improved solid urea-form type fertilizer composition of claim 9 wherein from 2 to 50 percent of a trace element mixture, based on the said solid content of said condensate, containing at least one element suitable for nourishment of the soil is added to said liquid condensate, whereby said trace element mixture is also uniformly distributed throughout said solid product for slow release to the soil.

References Cited by the Examiner

UNITED STATES PATENTS

| | | | |
|---|---|---|---|
| 2,828,182 | 3/1958 | Cheronis et al. | 23—27 |
| 2,833,640 | 5/1958 | Bersworth | 71—27 |
| 2,882,141 | 4/1959 | O'Donnell | 71—30 |
| 2,936,226 | 5/1960 | Kaufman et al. | 71—1 |
| 2,958,594 | 11/1960 | Halpern et al. | 71—1 |

DONALL H. SYLVESTER, *Primary Examiner.*